(12) United States Patent
Seman, Jr. et al.

(10) Patent No.: US 7,686,853 B2
(45) Date of Patent: Mar. 30, 2010

(54) APPARATUS FOR INTERCONNECTING BATTERY CELLS IN A BATTERY PACK AND METHOD THEREOF

(75) Inventors: Andrew E. Seman, Jr., White Marsh, MD (US); Christopher R. Yahnker, Raleigh, NC (US); Daniel J. White, Baltimore, MD (US); Daniele C. Brotto, Baltimore, MD (US); David A. Carrier, Aberdeen, MD (US); Steven J. Phillips, Ellicott City, MD (US); Danh T. Trinh, Parkville, MD (US)

(73) Assignee: Black & Decker Inc., Newark, DE (US)

( * ) Notice: Subject to any disclaimer, the term of this patent is extended or adjusted under 35 U.S.C. 154(b) by 1213 days.

(21) Appl. No.: 11/242,279

(22) Filed: Oct. 3, 2005

(65) Prior Publication Data

US 2006/0026822 A1 Feb. 9, 2006

Related U.S. Application Data

(62) Division of application No. 10/963,367, filed on Oct. 11, 2004, now Pat. No. 6,972,544.

(60) Provisional application No. 60/510,123, filed on Oct. 14, 2003.

(51) Int. Cl.
*H01M 10/04* (2006.01)
*H01M 2/10* (2006.01)

(52) U.S. Cl. .................. 29/623.1; 429/99; 429/100
(58) Field of Classification Search .................. None
See application file for complete search history.

(56) References Cited

U.S. PATENT DOCUMENTS

| | | | | |
|---|---|---|---|---|
| 5,977,746 | A * | 11/1999 | Hershberger et al. | 320/112 |
| 6,399,238 | B1 * | 6/2002 | Oweis et al. | 429/99 |
| 6,455,190 | B1 * | 9/2002 | Inoue et al. | 429/160 |
| 6,627,345 | B1 * | 9/2003 | Zemlok et al. | 429/99 |

* cited by examiner

*Primary Examiner*—John S Maples
(74) *Attorney, Agent, or Firm*—Harness, Dickey & Pierce, P.L.C.

(57) ABSTRACT

A battery pack for a cordless power has a plurality of battery cells disposed in a housing. In an embodiment of the invention, battery cells are interconnected with a laminated plate structure having non-conductive layers interspersed with conductive layers, at least one of the conductive layers connected to the battery cells to interconnect them. In an embodiment of the invention, battery cells in a battery pack are interconnected with a flexible printed circuit board having conductive traces thereon that are attached to the battery cells to interconnect them. In an embodiment of the invention, a cordless power tool has one or the other of the foregoing battery packs. In an embodiment of the invention, the battery cells are Lithium Ion battery cells.

5 Claims, 6 Drawing Sheets

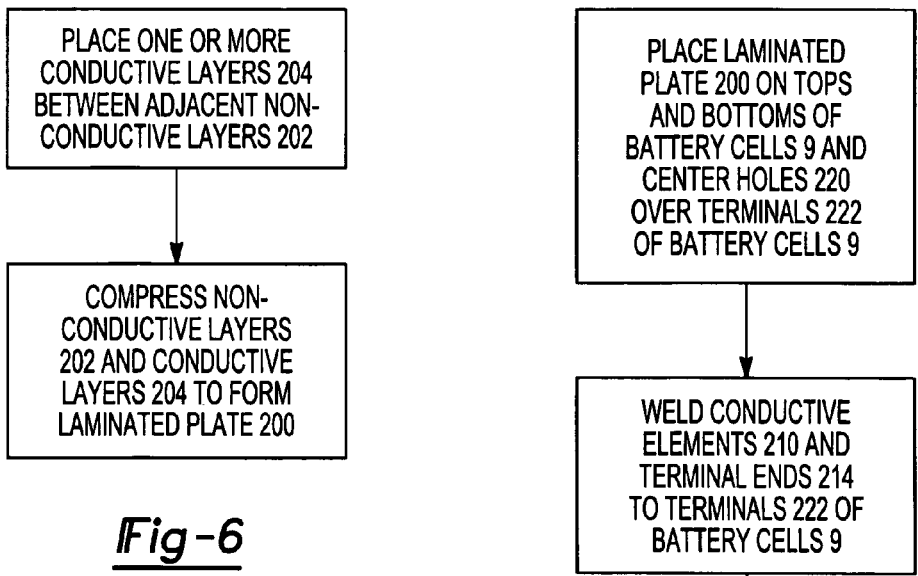
Fig-6
Fig-7
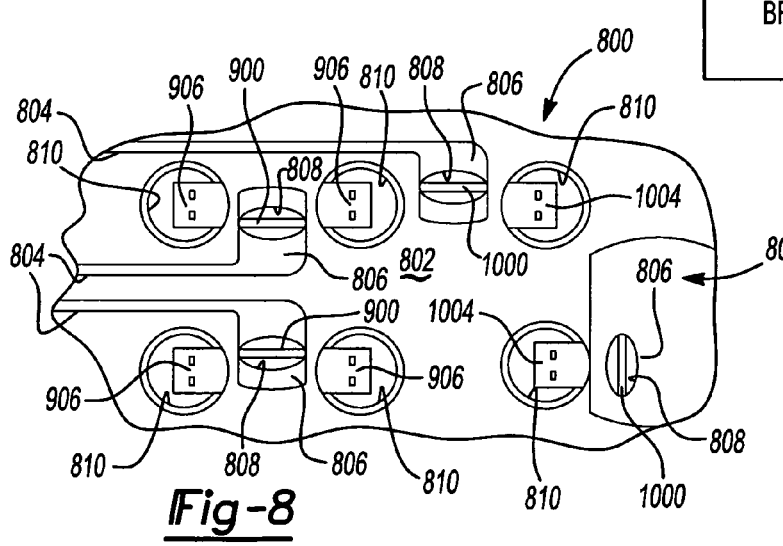
Fig-8
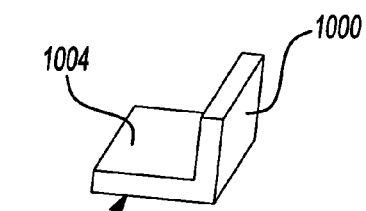
Fig-10
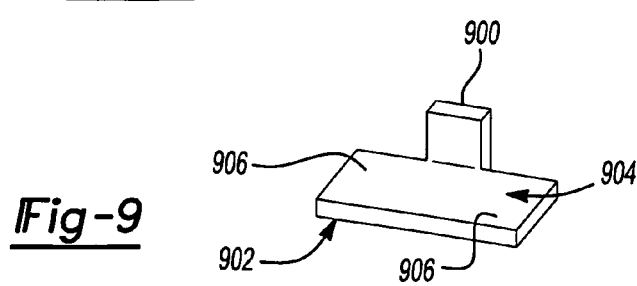
Fig-9

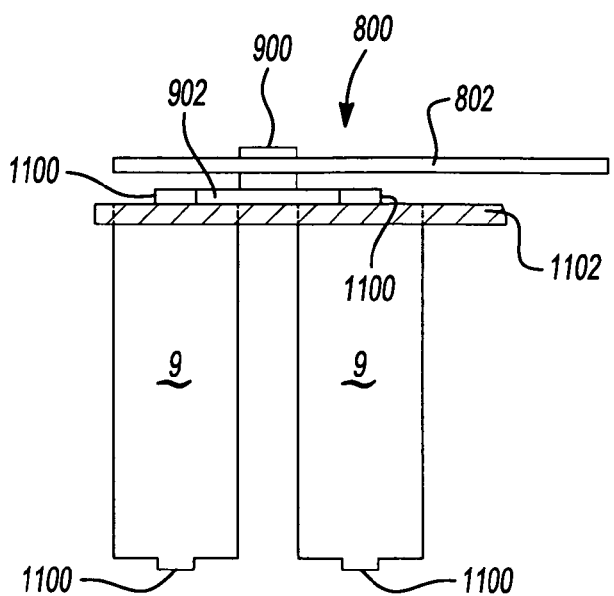

*Fig-11*

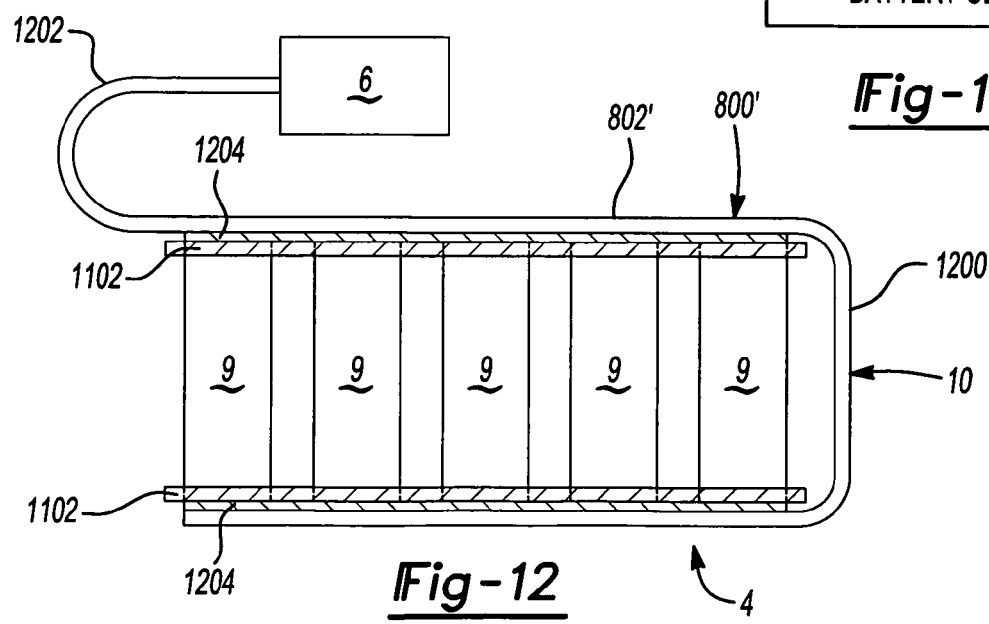

*Fig-12*

```
┌─────────────────┐
│ FORM CONDUCTIVE │
│    TRACES ON    │
│  SUBSTRATE 802  │
└────────┬────────┘
         │
         ▼
┌─────────────────┐
│ PLACE INTERCONNECT│
│ TABS 902 AND END │
│ CONNECT TABS 1002│
│  ON SUBSTRATE 802│
│    AND SOLDER    │
└────────┬────────┘
         │
         ▼
┌─────────────────┐
│  PLACE FLEXIBLE PCBS │
│   800 ON TOPS AND    │
│  BOTTOMS OF BATTERY  │
│       CELLS 9        │
└────────┬────────┘
         │
         ▼
┌─────────────────┐
│ WELD INTERCONNECT│
│ TABS 902 AND END │
│ CONNECT TABS 1002│
│  TO TERMINALS 1100 OF│
│    BATTERY CELLS 9   │
└─────────────────┘
```

*Fig-13*

APPARATUS FOR INTERCONNECTING BATTERY CELLS IN A BATTERY PACK AND METHOD THEREOF

CROSS-REFERENCE TO RELATED APPLICATIONS

This application is a divisional application of U.S. patent application Ser. No. 10/963,367 filed on Oct. 11, 2004, now U.S. Pat. No. 6,972,544 which claims the benefit of U.S. Provisional Application No. 60/510,123 filed on Oct. 14, 2003.

FIELD OF THE INVENTION

The present invention relates to battery packs, and more particularly, to a battery pack having a plurality of battery cells interconnected by a laminated plate structure or a flexible printed circuit board.

BACKGROUND OF THE INVENTION

Cordless products which use rechargeable batteries are prevalent throughout the workplace as well as in the home. From housewares to power tools, rechargeable batteries are used in numerous devices. Ordinarily, nickel-cadmium or nickel-metal-hydride battery cells are used in these devices. Since the devices use a plurality of battery cells, the battery cells are ordinarily packaged as battery packs. These battery packs couple with the cordless devices and secure to the device. The battery pack may be removed from the cordless device and charged in a battery charger or charged in the cordless device itself.

Currently the cells in a battery pack are assembled by holding them in a fixture and welding individual interconnect straps between the contact points of cell pairs. This process involves affixing and restraining each interconnect strap to a single cell pair and resistance welding the strap onto the contact points. After this strap is welded, the process is repeated serially for the next cell. These straps are arranged to produce strings of cells arranged in series and/or parallel configurations. One of the difficulties with this process is that the interconnect straps must be individually affixed and restrained during the welding process. Another deficiency is that the welding process can only be completed for one cell pair at a time.

SUMMARY OF THE INVENTION

In an embodiment of the invention, battery cells in a battery pack are interconnected with a laminated plate structure having non-conductive layers interspersed with conductive layers, at least one of the conductive layers connected to the battery cells to interconnect them.

In an embodiment of the invention, battery cells in a battery pack are interconnected with a flexible printed circuit board having conductive traces thereon that are attached to the battery cells to interconnect them.

In an embodiment of the invention, a cordless power tool has one or the other of the foregoing battery packs. In an embodiment of the invention, the battery pack is a Lithium Ion battery pack with the battery cells being Lithium Ion battery cells.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a flow chart of a process to form the laminated plate structure of FIG. 2;

FIG. 7 is a flow chart of interconnecting battery cells in a battery pack with the laminated plate structure of FIG. 2;

FIG. 8 is a bottom view of a flexible printed circuit board for interconnecting battery cells in a battery pack in accordance with an embodiment of the invention;

FIG. 9 is a side perspective view of an interconnect tab of the flexible printed circuit board of FIG. 8;

FIG. 10 is a side perspective view of an end connect tab of the flexible printed circuit board of FIG. 8;

FIG. 11 is a side view, broken away, of the flexible printed circuit board of FIG. 8 interconnecting battery cells in a battery pack in accordance with an embodiment of the invention;

FIG. 12 is a side view of a variation of the flexible printed circuit board interconnecting battery cells in a battery pack in accordance with an embodiment of the invention;

FIG. 13 is a flow chart of forming the flexible printed circuit board of FIG. 8 and using it to interconnect battery cells of a battery pack in accordance with an embodiment of the invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
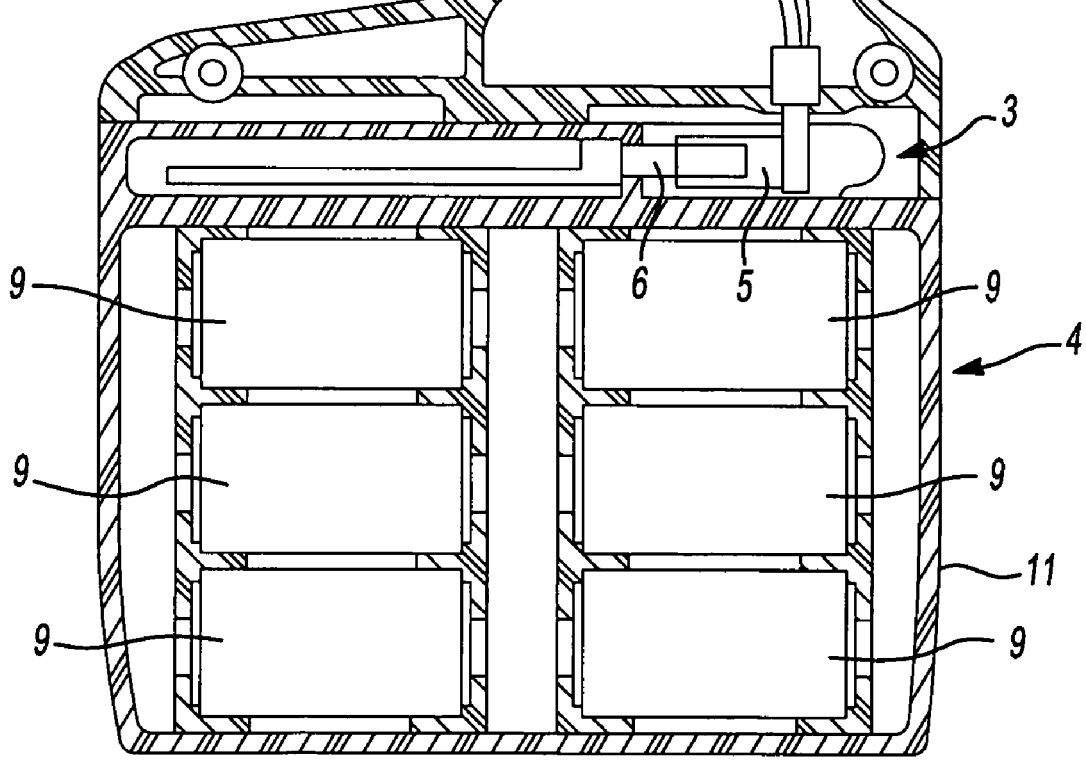
FIG. 1 is a side sectional view of a cordless power tool.

With reference to FIG. 1, a cordless device, such as a power tool, is illustrated and designated with reference numeral 1. The power tool 1 ordinarily includes a clam shell type housing 2. The housing 2 includes a mechanism 3 to couple the housing 2 with a battery pack 4. The cordless device 1 includes electrical elements 5 which couple with corresponding electrical elements 6 of the battery pack 4. The device 1 includes a trigger 7 which is activated for energizing a motor 8 provided within the housing 2, as is well known in the art. Normally, a plurality of battery cells 9 are disposed within a housing 11 of battery pack 4. A controller 10 may be provided in housing 2 for controlling motor 8. Controller 10 may alternatively (or additionally) be disposed in battery pack 4 and may also be used for controlling the charge of battery pack 4, as well as its discharge.

Figure 2:
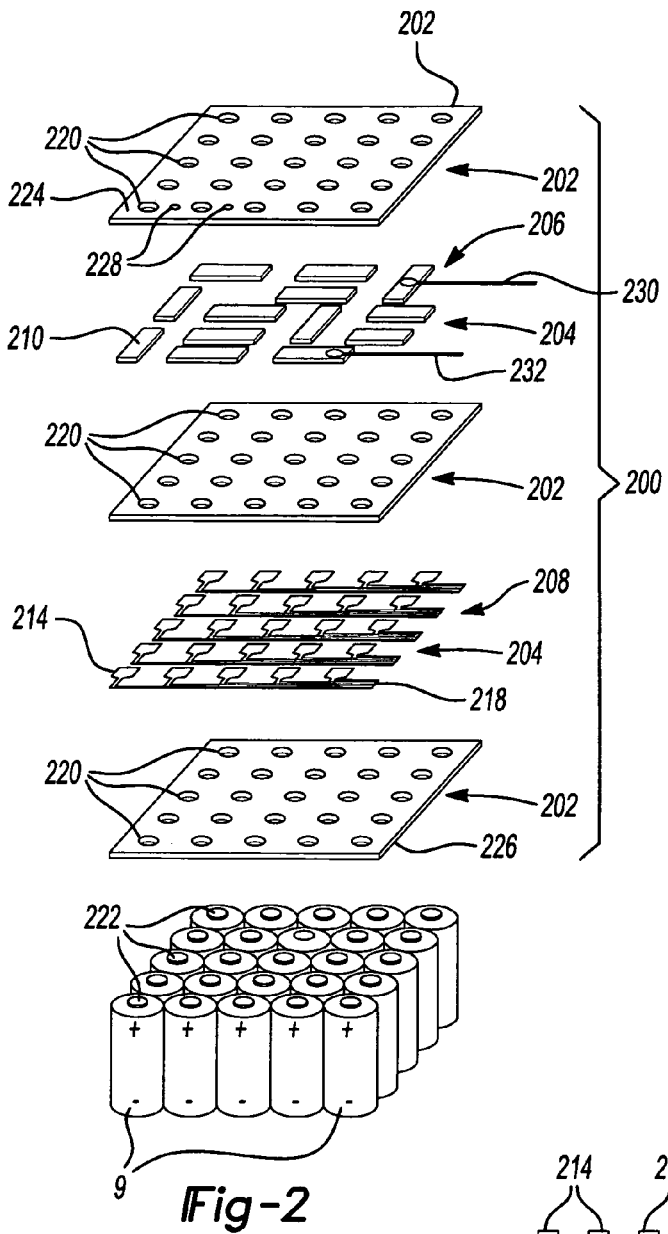
FIG. 2 is an exploded assembly view of a laminated plate structure interconnecting battery cells in a battery pack in accordance with an embodiment of the invention.
Figure 3:
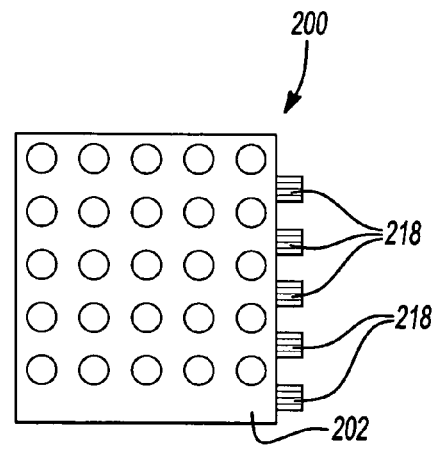
FIG. 3 is a top view of the laminated plate structure of FIG. 2.

In FIGS. 2 and 3, a laminated plate structure 200 is shown for interconnecting a plurality of battery cells, such as battery cells 9 in battery pack 4, and connecting the battery cells 9 to external devices, such as electrical elements 6. Laminated plate structure 200 includes a plurality of non-conductive or insulation layers 202 with one or more "conductive layers" 204 sandwiched between adjacent non-conductive layers 202. As used herein, the term "conductive layer" means a layer of conductive elements disposed in a plane.

In the embodiment shown in FIGS. 2 and 3, laminated plate structure 200 includes five layers, three non-conductive layers 202 and two conductive layers 204. Non-conductive layers 202 may illustratively be stamped from electrically non-conductive material, such as Mylar, cardboard, or the like. One conductive layer 204, designated with reference numeral 206 and which will be referred to as power circuit layer 206, may illustratively provide power circuit interconnections and the other conductive layer, designated with reference numeral 208 and which will be referred to as signal layer 208, may illustratively provide signal interconnections.

Figure 4:
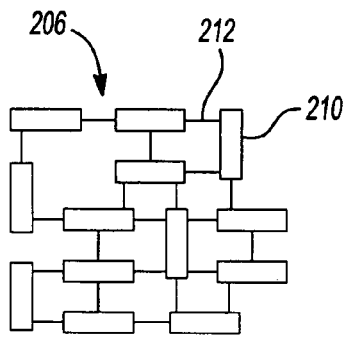
FIG. 4 is a top view of a conductive element grid of the laminated plate structure of FIG. 2.

Power circuit layer 206 includes a plurality of conductive elements 210. (For clarity, only one of the conductive elements 210 is identified with the reference numeral 210 in FIG. 2.) Conductive elements 210 may illustratively be conductive metal strips formed such as by stamping them from a sheet of conductive metal, such as nickel, plated steel, and the like. Conductive elements 210 may illustratively be joined together for ease of handling conductive layer 204 during assembly of laminated plate structure 200, such as by connecting segments 212 as shown in FIG. 4. Connecting segments 212 may illustratively be formed along with conductive elements 210. For example, if conductive elements 210 are formed by stamping them from a sheet of conductive metal then connecting segments 212 may be formed at the same time by stamping them from the sheet of conductive metal.

Signal layer 208 includes a plurality of terminal pads 214 (only some of which are designated with the reference numeral 214 for clarity) having leads 218. Signal layer 208 may illustratively be formed by stamping from a sheet of conductive material, such as metal. It may also be formed as a printed circuit board using conventional printed circuit board etching techniques, and may illustratively be a flexible printed circuit board. Power circuit layer 206 may also illustratively be a printed circuit board, such as a flexible printed circuit board. In this regard, by forming power circuit layer 206 as a printed circuit board etched only on one side, it could act as both a conductive layer 204 and one of the conductive layers 202. Similarly, forming by forming signal layer 208 as a printed circuit board etched only on one side, it too could act as both a conductive layer 204 and a non-conductive layer 202.

Each non-conductive layer 202 may illustratively include a plurality of holes 220 therein (only some of which are identified with the reference numeral 220 for clarity.) Each hole 220, when laminated plate structure 200 is affixed to battery cells 9, will be disposed about a terminal 222 at one end of a battery cell 9. (For clarity, only some of terminals 222 of battery cells 9 are identified with the reference numeral 222.) Laminated plate structures may illustratively be affixed to tops and bottoms of the battery cells 9 of battery pack 4.

FIG. 6 is a flow chart of an illustrative method of assembling laminated plate structure 200. At step 600, one or more conductive layers 204 are disposed between adjacent non-conductive layers 202 and at step 602, the non-conductive layers 202 and the conductive layers 204 compressed together to form laminated plate structure 200 and illustratively bonded together. Terminal pads 214 of signal layer 208 are illustratively centered in respective holes 220 in non-conductive layers 202 and conductive elements 210 of power circuit layer 206 extend between respective adjacent holes 220 with an end disposed in axial spaced relation to those holes 220. In the embodiment shown in FIG. 2, laminated plate structure 200 has five layers, three non-conductive layers 202 with a conductive layer disposed between adjacent non-conductive layers 202. It should be understood that laminated plate structure 200 can have more or less than five layers but preferably will have an odd number of layers with a non-conductive layer 202 providing a top layer 224 and bottom layer 226 of laminated plate structure 200.

FIG. 7 is a flow chart of an illustrative method of assembling laminated plate structure 200 to battery cells 9 to interconnect the battery cells to each other and to electrical elements 6. At step 700, a laminated plate structure 200 is placed on the tops and the bottoms of battery cells 9. Holes 220 are centered over terminals 222 of battery cells 9. A welding tip (not shown), for example, the welding tip of a spot welder, is inserted into each hole 220 having a conductive element 210 of power circuit 206 and/or terminal pad 214 disposed therein and presses them against the terminal 222 of the battery cell 9 disposed in that hole. The conductive element 210 and/or terminal pad 214 is then welded to the terminal 222 of that battery cell 9. All welds may illustratively be done simultaneously, individually, or in sequence with two or more welds being done simultaneously. Simultaneously with the welding, or after, the connecting segments 212 are broken, such as by punching them using a punch press. In this regard, holes 228 (only some of which are shown for clarity) may be provided in non-conductive layers 202 opening to connecting segments 212 to facilitate the removal of connecting segments 212.

Conductive elements 210 connect the terminals 222 of two or more adjacent battery cells 9 together to connect those battery cells 9 in series or in parallel and terminal pads 214 provide signal connections to positive and negative terminals of battery cells 9. For example, if two adjacent cells are to be connected in series, one cell is oriented with its positive terminal up and the other cell is oriented with its negative terminal up. An end of a conductive element 210 is welded to the positive terminal of the one cell 9 and the other end welded to the negative terminal 22 of the other battery cell 9. If two adjacent battery cells 9 are to be connected in parallel, they are oriented with their positive terminals up and a conductive element 210 welded to the positive terminal of each such battery cell 9 and a conductive element 210 welded to the negative terminal of each such battery cell 9. Similarly, if three or more battery cells 9 are to be connected in parallel, they are oriented with their positive terminals up and a conductive element 210 welded to the positive terminal of each such battery cell 9 and a conductive element 210 welded to the negative terminal of each such battery terminal 9. In this regard, these conductive elements 210 would extend between the three or more adjacent holes 220 that are centered about the terminals of such battery cells 9. Also, at least one such conductive element may illustratively be connected to a lead 230 and at least one such conductive element may illustratively be connected to a lead 232, which may in turn connected to electrical elements 6 (FIG. 1). From this discussion, it should be apparent that conductive elements 210 are sized and arranged in power circuit layer 206 to provide the desired interconnections of battery cells 9 to each other and to electrical elements 6.

Figure 5:
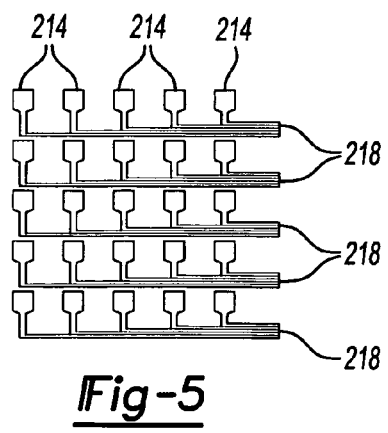
FIG. 5 is a top view of a signal layer of the laminated plate structure of FIG. 2.

Also, while signal layer 208 in the embodiment shown in FIGS. 2, 3 and 5 has a terminal pad 214 for each battery cell 9, this is by way of example only and it should be understood that signal layer 208 may illustratively have terminal pads 214 only for those battery cells that require a signal connection. If for example, the voltage of the battery pack 4 containing battery cells 9 is being monitored and no other parameter is being monitored, signal layer 208 may have only two terminals pads, one for positive and one for negative which would be welded to a positive and to a negative terminal of the appropriate battery cells 9.

While in the embodiment shown in FIGS. 2 and 3, each non-conductive layer 202 has a hole 220 for each battery cell 9, it should be understood that each non-conductive layer 202 need have a hole 220 only for those battery cells having terminals that will be welded to a conductive element 210 and/or a signal terminal pad 214 by a weld tip extending through the hole 220.

In FIGS. 8-10, a flexible printed circuit board ("PCB") 800 is shown for interconnecting a plurality of battery cells, such as battery cells 9 in battery pack 4, and connecting the battery cells 9 to external devices, such as electrical elements 6. Flexible PCB 800 includes a substrate 802 made of flexible material, such as Mylar, having conductive traces 804 thereon. Conductive traces 804 include pads 806, which may illustratively be solder pads. Substrate 802 has holes 810 therein disposed adjacent solder pads 806. There may illustratively be one hole 810 per battery cell 9 with holes 810 disposed in substrate 802 so that when substrate 802 is placed over battery cells 9, as described below, a hole 810 will be axially aligned with a terminal 1100 of each battery cell 9. Each solder pad 806 has a slot 808 therein for receiving a blade 900 of an interconnect tab 902 (FIG. 9) or a blade 1000 of an end connect tab 1002, as applicable depending whether solder pad 806 interconnects adjacent battery cells 9 or is an end connection that is connected to external elements, such as electrical elements 6. Interconnect tabs 902 and end connect tabs 1002 are collectively referred to herein as connection tabs. Blade 900 of interconnect tab 902 extends generally normally from a body 904 of interconnect tab 902. Opposed tabs 906 of body 904 extend outwardly on either side of blade 900 and provide connection tabs or terminals, referred to herein as connection pads 906. Blade 1000 extends generally normally from a body 1004 of end connect tab 1002. Body 1004 provides connection tabs or terminals and which may also be referred to herein as connection tabs 1004.

Referring to FIG. 13, flexible PCB 800 is formed as follows. Conductive traces 804 are formed on substrate 802 in conventional fashion at 1300. Control electronics may then be optionally incorporated on PCB 800 to implement one or more control circuits. These optional control circuits can utilize surface mount components or through-hole components. The control circuits may include balancing circuits, battery cell monitoring circuits, and/or temperature monitoring circuits. Thermistors for sensing the temperatures of cells 9 may also be directly assembled to PCB 800. Blades 900 of interconnect tabs 902 and blades 1000 of end connect tabs 1002 are inserted into slots 808 of respective solder pads 806 and then soldered to solder pads 806 at 1302, such as by wave soldering or a similar method. Opposed tabs 906 of each interconnect tab 902 extend over holes 810 that are adjacent either side of the solder pad 806 to which the blade 900 of that interconnect tab is soldered. Body 1004 of each end connect tab 1002 extends over the hole 810 that is adjacent the solder pad 806 to which the blade 1000 of that end connect tab 1002 is soldered.

Continuing to refer to FIG. 13, at 1304 a resulting flexible PCB 800 is then placed over the cells 9 of battery pack 4 with body 904 of interconnect tabs 902 and body 1004 of end connect tabs 1002 disposed between substrate 802 and battery cells 9. In this regard, one flexible PCB 800 may illustratively be placed over the tops of cells 9 and one flexible PCB 800 may be placed over the bottom of cells 9. Cell separator plates 1102 (only one of which is shown in FIG. 11), which may illustratively be made of a rigid non-conductive plastic, are disposed at generally the top and bottoms of battery cells 9 and have holes in which battery cells 9 are received. Cell separator plates 1102 hold battery cells 9 in spaced relation to each other and in the proper position for placement of flexible PCB 800(s). At 1306, connection pads 906 of interconnect tabs 902 and connection pads 1004 of end connect tabs 104 are fastened to terminals 1100 of respective battery cells 9, such as by welding in a manner similar to that described above with respect to FIG. 2. Conductive traces 804 connect their solder pads 806 in the appropriate configuration so that the flexible PCB(s) 800 thus interconnects battery cells 9 in the desired configuration, such as connecting the appropriate number of battery cells 9 in series and/or in parallel to provide the desired voltage and power, and provides connection points, illustratively at solder pads 806 to which end connect tabs are soldered, to connect battery pack 4 to external elements, such as electrical elements 6.

FIG. 12 shows a variation of flexible PCB 800, designated by the reference numeral 800'. As shown in FIG. 12, substrate 802' extends both along the top and bottom of battery cells 9 of battery pack 4. A portion 1200 of substrate 802' that extends between the top and bottoms of battery cells 9 may illustratively include an electronic circuit with electronic devices thereon, such as controller 10 for controlling battery pack 4 and/or motor 8.

Substrate 802 may also have a lead portion 1202 that extends to external devices, such as electrical elements 6 and connects thereto. Lead portion 1202 thus provides the lead connections between battery pack 4 and external devices, such as electrical elements 6.

In an embodiment of the invention, seals 1204 are provided between substrate 802' of flexible PCB 800 and the tops and bottoms of battery cells 9. Seals 1204 may illustratively be made of synthetic foam or a plastic sheet and have adhesive layers on their top and bottom surfaces to adhere them to battery cells 9 and substrate 802' of flexible PCB 800'.

Figure 14:
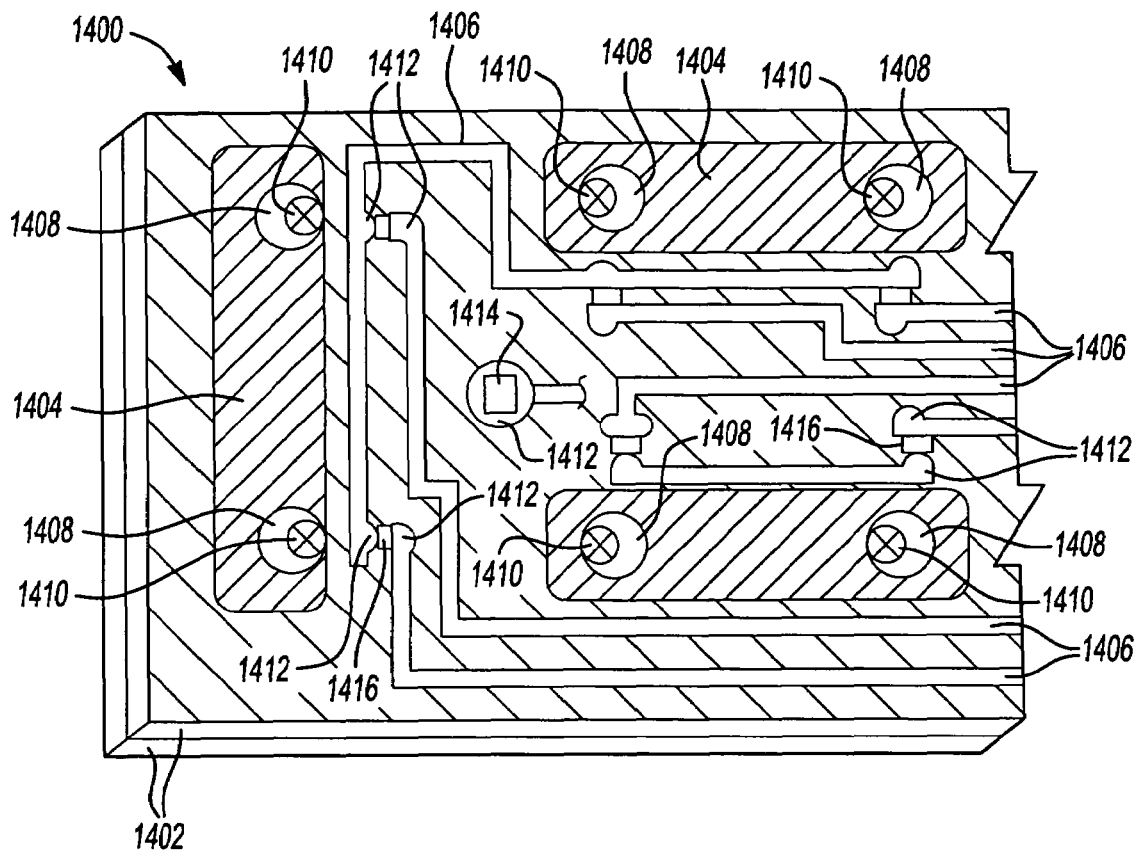
FIG. 14 is a top perspective view of a flexible printed circuit board for interconnecting battery cells using a direct connection of conductive traces of the flexible printed circuit board to the battery cells.
Figure 15:
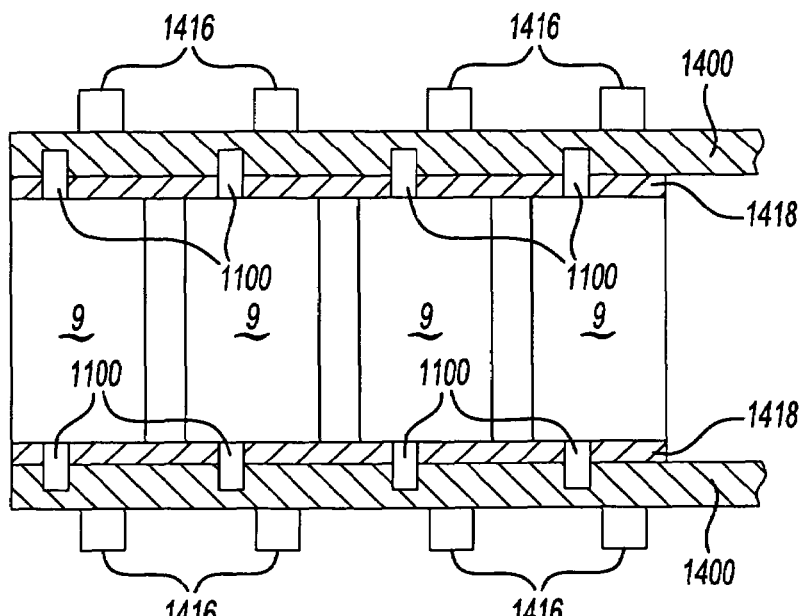
FIG. 15 is a side view of the flexible printed circuit board of FIG. 14 interconnecting battery cells.
Figure 16:
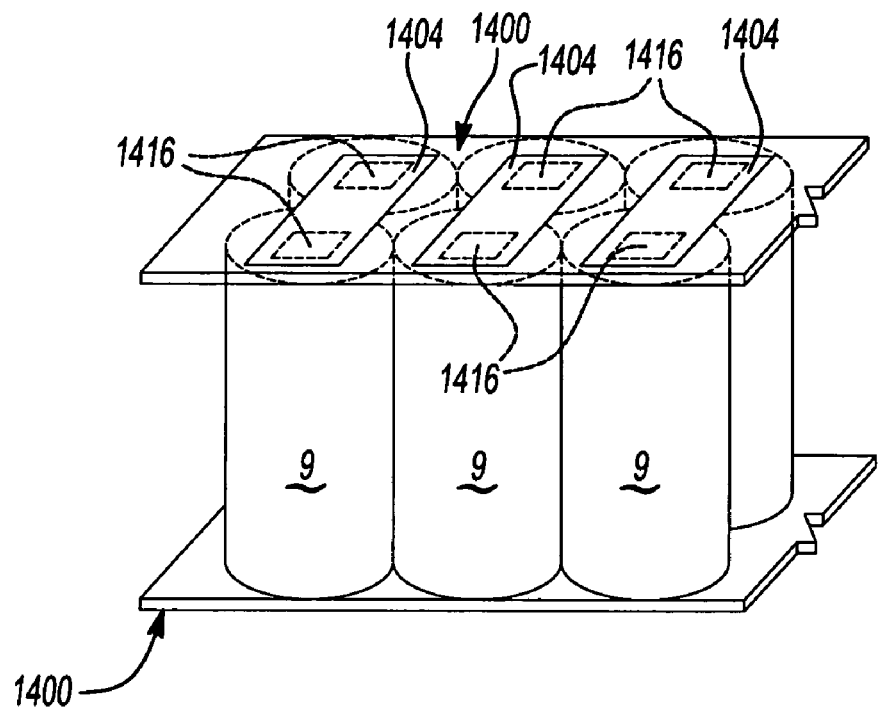
FIG. 16 is a side perspective view of the flexible printed circuit board of FIG. 14 interconnecting battery cells.

FIGS. 14-16 show the interconnection of a plurality of cells 9 using direct bonding of a high-current flexible PCB 1400 to contact surfaces, such as terminals 1100, of cells 9. In this regard, it should be understood that terminals 1100 may be flat contact surfaces as opposed to projecting terminal elements. This method is similar to the method just described and offers many of the same benefits. The principal difference is that a direct bonded connection is used instead of the connection tabs. This simplifies assembly and provides better coupling between any included temperature sensing thermistors, such as thermistors 1416, and the cells 9 that are monitored with the thermistors 1416.

Flexible PCB 1400 includes one or more substrates 1402 made of a flexible material, such as Mylar, having conductive traces 1404 and 1406 thereon. Where PCB 1400 has more than one substrate 1402, conductive traces 1404, 1406 may be placed on different ones of the substrates 1402. Portions of the Mylar are removed during fabrication of PCB 1400 to expose portions of the conductive traces 1404, shown at 1408. PCB 1400 has holes 1410 that extend through all the substrates 1402 and the conductive traces 1404 thereon to allow welding tips of resistance welding equipment to contact the contact surfaces 1100 of the cells 9. Alternatively, non-resistance welding methods, such as friction or ultrasonic welding, may be used to bond traces 1404 to contact surfaces 1100 which allows holes 1410 to be eliminated. Pads 1412 (only one of which is shown in FIG. 14) for electronic components, shown representatively at 1414, may also be formed on PCB 1400 using standard manufacturing techniques. As used herein, an electronic component is a component used in an electronic circuit and includes both passive components, such as resistors, capacitors, inductors, thermistors, and active components, such as transistors, operational amplifiers and integrated circuits. These pads 1412 can be placed in available space on substrates 1402 and allows for the integration of various electronic functions of the battery pack 4 by appropriate configurations of these electronic components. Thermistors 1416 are assembled onto these pads 1412 in positions in close proximity to where PCB 1400 connects to the cells 9 to provide for more accurate temperature readings from cells 9. The electronic components 1414 including thermistors 1416 are assembled onto PCB 1400 using conventional wave soldering or similar methods.

To assemble PCB 1400 to cells 9, cell separator plates 1418 are placed on the tops and bottoms of the individual cells 9 to hold the cells in position during assembly. PCB 1400 is then placed over the tops of the cells 9 with the exposed areas 1408 aligned with the contact surfaces 1100 of cells 9. A welding tip, such as spot welding electrodes (not shown), are placed inserted through one or more holes 1410 to contact a portion of the contact surface 1100 of the respective cell 9. A second spot welding electrode contacts the exposed portion 1408 of trace 1404 and applies welding current to the exposed portion 1408 to weld trace 1404 to the contact surface 1100 of the cell 9. Exposed portion 1408 may also be attached to contact surface 1100 of the cell 9 by soldering. Conductive traces 1408 interconnect the battery cells 9 and the substrate 1402 having conductive traces 1404 provides a power circuit layer and the substrate 1402 having conductive traces 1406 provides a signal layer.

Figure 17:
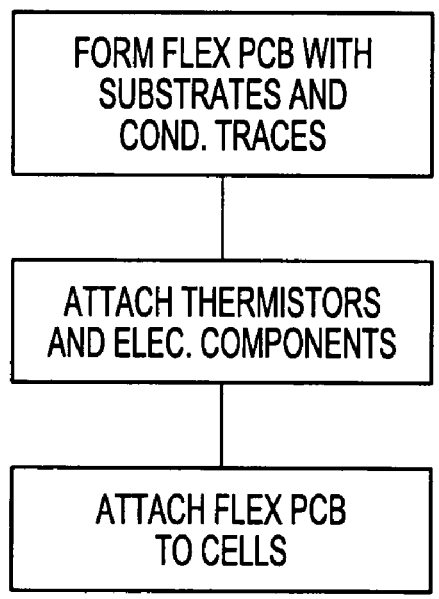
FIG. 17 is a flow chart of forming the flexible printed circuit board of FIG. 14 and using it to interconnect battery cells of a battery pack in accordance with an embodiment of the invention

Referring to FIG. 17, flexible PCB 1400 is formed with one or more substrate layers 1402 of flexible material with conductive traces 1404, 1406 thereon. During this formation of PCB 1400, the flexible material is removed around portions 1408 of conductive traces 1404, 1406. It should be understood, however, that the flexible material could be removed after PCB 1400 is formed with one or more substrates 1402 conductive traces 1404, 1406 thereon. The thermistors 1416 and any other of the electronic components 1414 are then assembled to pads 1412 of conductive traces 1404, 1406. PCB 1400 is then attached to cells 9.

In a variation, exposed portions 1408 of traces 1404 are bonded to the contact surfaces 1100 of the cells 9 by conductive adhesive. The adhesive is placed between the exposed portions 1408 and the contact surfaces 1100 on the tops or bottoms the cells 9. PCB 1400 is then pressed and held against the cells 9 during the cure phase. The same process is then used for attaching PCB 1400 to the other side of cells 9. The assembly of PCB 1400 and cells 9 is then placed in housing 11.

Flexible PCB 1400 advantageously provides a thinner package than a standard printed circuit board as it is comprised of thin conductive layers encapsulated in any insulating material, such as Mylar. Using surface mount parts allows for low profile control circuits. It also provides ease of manufacture in that all temperature monitoring and balance circuitry is populated on flexible PCB 1400 before flexible PCB 1400 is attached to cells 9. Flexible PCB 1400 along with the control circuits in effect becomes a "plug-in" module. Using all metal connections in the temperature monitoring circuit (i.e., copper welded to can, surface mount thermistors soldered to pads 1412) eliminates the need to glue the thermistors 1416 in place or trying to detect temperature through paper insulators. The flexible printed circuit board can be extended, such as described with reference to FIG. 12, to terminate at terminals for the battery pack eliminating the need for additional wiring inside the battery pack. This may also eliminate the need for paper insulation on the top and bottom of cells 9 in that the Mylar covering on flexible PCB 1400 provides the needed insulation.

The above discussed battery packs and techniques for interconnecting battery cells in them can be advantageously used in high voltage battery packs, such as when cells 9 are Lithium Ion battery cells. The interconnections techniques described above can handle the higher output of Li Ion battery pack. Also, in Li Ion battery packs the temperature of each cell 9 should be individually monitored. This is accomplished such as by the use of a thermistor 1416 for each cell 9 as discussed above with reference to FIGS. 14-16. Electronic components 1414 would be configured to provide a temperature monitoring circuit using thermistors 1416 and appropriate other electronic components, such as thermal fuses. Electronic components 1414 would also be configured to provide a cell balancing circuit and would illustratively include a surface mount microprocessor and appropriate passive and active surface mount devices.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of making a battery pack for a cordless power tool, comprising, the battery pack having a housing in which a plurality of battery cells are disposed, the method comprising:
    interconnecting the plurality of battery cells with a plurality of conductive elements; and
    connecting a conductive layer of a laminated plate having the conductive layer and a first non-conductive layer to at least one of the conductive elements.

2. The method of claim 1 including disposing a cell separator plate between the battery cells and the laminated plate.

3. The method of claim 1 wherein the conductive elements include interconnecting tabs and interconnecting the plurality of cells with the plurality of conductive elements includes interconnecting the plurality of cells with the interconnecting tabs.

4. The method of claim 1, including connecting the conductive layer to at least one thermistor.

5. The method of claim 1 wherein the laminated plate includes a flexible printed circuit board and connecting the conductive layer of the laminated plate to at least one of the conductive elements includes connecting a conductive trace of the flexible printed circuit board to at least one of the conductive elements.

* * * * *